(12) United States Patent
Kim et al.

(10) Patent No.: US 9,558,895 B2
(45) Date of Patent: Jan. 31, 2017

(54) METHOD FOR PREPARING CARBON NANOFIBER COMPOSITE AND CARBON NANOFIBER COMPOSITE PREPARED THEREBY

(71) Applicant: DAEGU GYEONGBUK INSTITUTE OF SCIENCE AND TECHNOLOGY, Daegu (KR)

(72) Inventors: Soonhyun Kim, Daejeon (KR); Sang Kyoo Lim, Daegu (KR); Sung-Ho Hwang, Daegu (KR); Minsun Kim, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 114 days.

(21) Appl. No.: 14/432,689

(22) PCT Filed: Oct. 2, 2013

(86) PCT No.: PCT/KR2013/008827
§ 371 (c)(1),
(2) Date: Mar. 31, 2015

(87) PCT Pub. No.: WO2014/077508
PCT Pub. Date: May 22, 2014

(65) Prior Publication Data
US 2015/0243451 A1  Aug. 27, 2015

(30) Foreign Application Priority Data
Nov. 13, 2012  (KR) .......................... 10-2012-0128390

(51) Int. Cl.
*H01G 11/36* (2013.01)
*D01F 1/10* (2006.01)
(Continued)

(52) U.S. Cl.
CPC .............. *H01G 11/36* (2013.01); *D01D 1/02* (2013.01); *D01D 5/003* (2013.01); *D01D 5/0007* (2013.01);
(Continued)

(58) Field of Classification Search
None
See application file for complete search history.

(56) References Cited

U.S. PATENT DOCUMENTS

| 2008/0242785 A1 | 10/2008 | Ma et al. |
| 2009/0175757 A1* | 7/2009 | Yao .................. C04B 41/009 422/4 |

(Continued)

FOREIGN PATENT DOCUMENTS

| JP | 2009 035 463 | 2/2009 |
| KR | 1020 0500 4857 9 | 5/2005 |

(Continued)

*Primary Examiner* — Dion R Ferguson
(74) *Attorney, Agent, or Firm* — Emerson Thomson Bennett, LLC; Daniel A. Thomson (57) ABSTRACT

The present invention relates to a method for preparing a carbon nanofiber composite, and a carbon nanofiber composite prepared thereby. The method for preparing a carbon nanofiber composite provided by the present invention has reduced costs and is economical and efficient compared with a convention method for preparing a carbon nanofiber composite. In addition, the carbon nanofiber composite of the present invention can provide remarkable decomposition performance of organic pollutants, and a carbon nanofiber composite prepared by the preparation method of the present invention can be used in an electrode for an electric double-layer supercapacitor, a fuel cell electrode, a filter, a hydrogen storage material, and the like.

15 Claims, 6 Drawing Sheets

(51) Int. Cl.
  *D01D 5/00* (2006.01)
  *D01F 6/18* (2006.01)
  *D01F 9/22* (2006.01)
  *H01M 4/96* (2006.01)
  *H01G 11/28* (2013.01)
  *H01G 11/52* (2013.01)
  *H01G 11/60* (2013.01)
  *H01G 11/78* (2013.01)
  *D01D 1/02* (2006.01)
  *D01F 11/16* (2006.01)
  *D01D 10/06* (2006.01)

(52) U.S. Cl.
  CPC . *D01F 1/10* (2013.01); *D01F 6/18* (2013.01); *D01F 9/225* (2013.01); *D01F 11/16* (2013.01); *H01G 11/28* (2013.01); *H01G 11/52* (2013.01); *H01G 11/60* (2013.01); *H01G 11/78* (2013.01); *H01M 4/96* (2013.01); *D01D 10/06* (2013.01); *D10B 2101/122* (2013.01); *Y02E 60/13* (2013.01); *Y02E 60/50* (2013.01); *Y10T 428/2918* (2015.01)

(56) References Cited

U.S. PATENT DOCUMENTS

| | | | |
|---|---|---|---|
| 2012/0070717 A1* | 3/2012 | Harada | B82Y 30/00 429/156 |
| 2012/0204890 A1* | 8/2012 | Rashidi | C25D 11/08 131/334 |
| 2013/0034794 A1* | 2/2013 | Liu | H01M 8/1004 429/480 |
| 2013/0196128 A1* | 8/2013 | Friedrich | C25D 11/022 428/209 |

FOREIGN PATENT DOCUMENTS

| | | |
|---|---|---|
| KR | 1020 0900 5179 3 | 5/2009 |
| KR | 1020 1000 7947 0 | 7/2010 |
| KR | 1020 1000 8636 7 | 7/2010 |

* cited by examiner

METHOD FOR PREPARING CARBON NANOFIBER COMPOSITE AND CARBON NANOFIBER COMPOSITE PREPARED THEREBY

TECHNICAL FIELD

The present invention relates to a method for preparing a carbon nanofiber composite and a carbon nanofiber composite prepared thereby, and more particularly, to a method for preparing a carbon nanofiber composite for effectively performing photocatalytic decomposition of non-degradable organic pollutants when compared to a plurality of carbon nanotubes prepared by a common method, and a carbon nanofiber composite prepared thereby.

BACKGROUND ART

A nanofiber is an ultrafine fiber having an extremely small diameter of about 1 urn or less, and is applied in diverse fields such as a medical material, a filter, micro electro mechanical systems (MEMS), a nano device, etc. The nanofiber has a very large surface area per unit mass, is flexible, and has plenty of micro spaces and large numbers of fibers present per unit area, and may be blended with other materials and may have good dispersibility with respect to external stress.

As one method of preparing the nanofiber, an electrospinning method is known. An electrospinning apparatus used in the electrospinning method includes a spinning tip for discharging a solution, a high voltage apparatus and a collector for collecting the nanofiber. A high voltage is applied to the spinning tip to charge droplets discharged from the spinning tip, and a stream is spurt from the droplets by electrostatic repulsion to form the nanofiber in the collector. In addition, the nanofiber may be prepared using microfluidic technique. The nanofiber having a core shell structure may be prepared using an apparatus composed of an injection tube and a collection tube, making middle fluid and outer fluid different and then, pushing with an external pressure.

Since the nanofiber has a very large surface area, the diversity of the function of the surface may be maximized. For example, the nanofiber may be used for preparing a functional nano device by forming an elastic electrode through the formation of a semiconductor nanowire on the nanofiber. The functional nano device may allow the formation of enable stretchable electronics, wearable devices, etc.

Meanwhile, a photocatalyst decomposing various non-degradable organic pollutants by absorbing light to produce a strong oxidant such as hydroxyl radicals is used in photocatalyst technique. The photocatalyst used may include a semiconductor oxide such as $TiO_2$, $ZnO$, $WO_3$ and $SnO_2$, and the $TiO_2$ photocatalyst is known to have the best efficiency among them. Studies on using the photocatalyst in water treatment or an air purification process have been conducted a lot; however have not been commercialized because of defects such as the recovery of a powder, etc.

Recently, a composite carbon nanofiber having photocatalytic activity is prepared by obtaining a carbon fiber precursor through electrospinning, coating photocatalyst sol and carbonizing to form a composite of a carbon nanofiber having effective adsorptive power with a photocatalyst capable of providing high decomposition efficiency. However, the coating process of the photocatalyst is necessary, and $SiO_2$ is added to the photocatalyst sol to be coated to prevent the deterioration of the efficiency of the photocatalyst due to the phase change of the photocatalyst during performing a carbonizing process, thereby inducing the decrease of the specific surface area of the composite.

In addition, in a common method, a spinning solution obtained by adding a titanium dioxide photocatalyst has been used for conducting the electrospinning for preparing a carbon nanofiber without a coating process. A composite nanofiber including titanium dioxide could be obtained through the method, and a carbon nanofiber containing titanium dioxide having an anatase crystalline phase and high photocatalytic activity has been prepared through a post oxidation process for forming the anatase crystalline phase. A carbon nanofiber structure containing the titanium dioxide may be prepared without conducting a coating process, however, many of titanium dioxide particles having the photocatalytic activity are buried in the carbon nanofiber, and the photocatalytic activity could not be exhibited.

DISCLOSURE OF THE INVENTION

Technical Problem

The present invention is derived to solve the above-described defects, and an object of the present invention is to provide a method for preparing a carbon nanofiber composite for effectively performing photocatalytic decomposition of non-degradable organic pollutants when compared to a plurality of carbon nanotubes prepared by a common method, and a carbon nanofiber composite prepared thereby.

Technical Solution

To solve the above tasks, there is provided in the present invention, a method for preparing a carbon nanofiber composite including (1) a step of preparing a spinning solution by mixing a material of a carbon fiber precursor, titanium dioxide ($TiO_2$) and a solvent; (2) a step of preparing a carbon nanofiber by electrospinning the spinning solution; (3) a step of heating the carbon nanofiber to stabilize; (4) a step of heating the stabilized carbon nanofiber in an inert atmosphere to carbonize; (5) a step of hydrothermally treating the carbonized carbon nanofiber in an aqueous alkaline solution to extend the titanium dioxide ($TiO_2$) from the inner part to the outer part of the carbon nanofiber into a titanate nanotube shape; and (6) a step of post oxidizing the hydrothermally treated carbon nanofiber.

According to one aspect, the carbon fiber precursor may be at least one selected from the group consisting of polyacrylonitrile (PAN), polymethylmethacrylate (PMMA), polyethylene oxide (PEO), polyvinyldifluoride and polypyrrole, and may be included in an amount ratio of 5 to 30 wt % with respect to 100 wt % of the spinning solution. The titanium dioxide ($TiO_2$) in the step of (1) may be synthesized by a sol-gel method and has a nanosize, and the titanium dioxide ($TiO_2$) may be included in an amount ratio of 1 to 30 wt % with respect to 100 wt % of the spinning solution.

According to one aspect, the solvent may be at least one selected from the group consisting of N,N-dimethylformamide (DMF), tetrahydrofuran (THF), γ-butyrolactone (GBL), N-methyl pyrrolidone, toluene, acetone and dimethyl acetamide (DMAc), and the electrospinning in the step of (2) may be conducted in an electric field of 10 to 30 kV.

The step of (3) may be conducted by heating the carbon nanofiber at 220 to 280° C. for 15 to 45 minutes in an air atmosphere, and the step of (4) may be conducted by firstly elevating the temperature to 600 to 800° C. with an elevating rate of 2 to 10° C./min in an inert gas atmosphere, heating at the temperature of 600 to 800° C. for 40 to 60 minutes, secondly elevating the temperature to 800 to 1,200° C. with an elevating rate of 2 to 10° C./min, and heating at the temperature of 800 to 1,200° C. for 40 to 60 minutes.

According to one aspect, the aqueous alkaline solution in the step of (5) may be a strongly alkaline solution, and the hydrothermal treatment in the step of (5) may be conducted at 120 to 180° C. for 20 to 24 hours.

In addition, a step of washing using distilled water or a weak acid may be further included between the step of (5) and the step of (6), and the step of (6) may be conducted by heating the hydrothermally treated carbon nanofiber at 300 to 500° C. for 1 to 3 hours in an air atmosphere.

According to another aspect of the present invention, there is provided a carbon nanofiber composite including a carbon nanofiber; and a plurality of titanate nanotubes extended from an inner part to an outer part of the carbon nanofiber to cover a portion or a whole of the carbon nanofiber.

A portion or a whole of a surface of the plurality of titanate nanotubes may include titanium dioxide ($TiO_2$) having an anatase crystalline phase.

According to another aspect of the present invention, there is provided an electrode for an electric double-layer supercapacitor including a case; an aqueous electrolyte solution introduced in the case; an anode formed on a current collector combined with the carbon nanofiber composite; a cathode immersed in the aqueous electrolyte solution; and a separator provided between the anode and the cathode for separating the anode and the cathode, and a fuel cell electrode including the carbon nanofiber composite, a filter including the carbon nanofiber composite and a hydrogen storage material including the carbon nanofiber composite are also provided.

Advantageous Effects

The method for preparing a carbon nanofiber composite and a carbon nanofiber composite prepared thereby according to the present invention may provide better decomposition rate with respect to organic pollutants than a carbon nanofiber composite prepared as a commonly known carbon nanofiber composite.

In addition, the efficiency of preparation processes is improved in consideration of a common technique, and yield is improved. Further, an economic preparation method in consideration of manufacturing time and costs may be provided.

BEST MODE FOR CARRYING OUT THE INVENTION

Hereinafter, the present invention will be described in more detail.

As described above, in the methods for preparing a carbon nanofiber composite in related arts, the specific surface area of the composite has been decreased due to the coating process of a photocatalyst, and when a spinning solution with a photocatalyst is electrospinned to solve the above-described defects, titanium dioxide ($TiO_2$) having a photocatalytic activity may be buried in the carbon nanofiber, and the photocatalytic activity may not be exhibited.

Thus, the prevent invention provides a method for preparing a carbon nanofiber composite and a carbon nanofiber composite prepared thereby to solve the above-described defects. Thus, a method for preparing a carbon nanofiber composite having better decomposition rate of an organic pollutant material and improved preparation yield than a common method for preparing a carbon nanofiber composite may be provided, and a carbon nanofiber composite prepared thereby may be provided.

First, the step of preparing the spinning solution by mixing the material of the carbon fiber precursor, the titanium dioxide ($TiO_2$) and the solvent as the step of (1) will be explained.

First, the material of the carbon fiber precursor will be explained.

The material of the carbon fiber precursor included in the spinning solution of the present invention plays the role of a support of the titanium dioxide and a titanate nanotube and has a large specific surface area and so, plays a significant role of adsorption of pollutants, etc.

According to one aspect, the carbon fiber precursor may be at least one selected from polyacrylonitrile (PAN), polymethylmethacrylate (PMMA), polyethylene oxide (PEO), polyvinyldifluoride and polypyrrole, and may be included in an amount ratio of 5 to 30 wt % with respect to 100 wt % of the spinning solution. In the case that the amount of the carbon fiber precursor is less than 5 wt %, a continuous formation of a fiber may become problematic, and in the case that the amount exceeds 30 wt %, the viscosity of the spinning solution may be increased, and a nozzle may be blocked, thereby causing defects on spinning.

Then, the titanium dioxide ($TiO_2$) will be explained.

The titanium dioxide ($TiO_2$) included in the spinning solution plays the role of removing an organic pollutant material by a photocatalytic reaction in the present invention.

According to one aspect, the titanium dioxide ($TiO_2$) in the step of (1) may be included in an amount ratio of 1 to 30 wt % with respect to 100 wt % of the spinning solution. In the case that the amount of the titanium dioxide ($TiO_2$) is less than 1 wt %, there may be a problem with the function of a photocatalyst, and in the case that the amount of the titanium dioxide ($TiO_2$) exceeds 30 wt %, the strength of the carbon nanofiber composite may become problematic. In addition, the titanium dioxide ($TiO_2$) may be synthesized by a sol-gel method and have a nanosize. In this case, the titanium dioxide ($TiO_2$) may be dispersed uniformly during performing a spinning process and may be distributed uniformly in the carbon nanofiber.

Then, the solvent will be explained.

The solvent included in the spinning solution plays the role of dissolving a polymer in the present invention.

According to one aspect, the solvent may be at least one selected from N,N-dimethylformamide (DMF), tetrahydrofuran (THF), γ-butyrolactone (GBL), N-methyl pyrrolidone, toluene, acetone and dimethyl acetamide (DMAc), and may preferably be included in an amount ratio of 40 to 90 wt % with respect to 100 wt % of the spinning solution.

In the present invention, a stirring step for mechanically stirring the spinning solution may be further included between the step of (1) and the step of (2). Through the further inclusion of the stirring step, the titanium dioxide ($TiO_2$) may be dispersed in the spinning solution uniformly and mixed completely.

Then, the step of (2) of electrospinning the spinning solution to obtain a carbon nanofiber will be explained.

The electrospinning is a process of preparing a carbon nanofiber that is a support as a non-woven fabric shape and plays the role of forming a carbon nanofiber support having a diameter size of several hundreds of nanometers in the present invention.

According to one aspect, the electrospinning in the step of (2) may be conducted in an electric field of 10 to 30 kV. In the case that the electric field is less than 10 kV, the formation of a thread through the spinning may not be performed, and in the case that the electric field exceeds 30 kV, a stable nanofiber shape may not be obtained.

Then, the step of (3) for heating the carbon nanofiber to stabilize will be explained.

The step of (3) is a step of stabilizing to carbonize the carbon nanofiber in the present invention, and in the step of (3), the carbon nanofiber may be heated at 220 to 280° C. for 15 to 45 minutes in an air atmosphere. In the case that the temperature is less than 220° C. or exceeds 280° C., or the heating time period is less than 15 minutes or exceeds 45 minutes, the structure of a linear polymer precursor may be changed into a trapezoidal structure through the stabilizing step. Thus, the formation of a carbon fiber with a stable shape in the carbonizing step may become problematic.

Then, the step of (4) for carbonizing by heating the stabilized carbon nanofiber in an inert atmosphere will be explained.

According to one aspect, the step of (4) may be performed by firstly elevating the temperature to 600 to 800° C. by a temperature elevating rate of 2 to 10° C./min, heating at 600 to 800° C. for 40 to 60 minutes, secondly elevating the temperature to 1,000 to 1,400° C., and heating at 1,000 to 1,400° C. for 40 to 60 minutes in an inert gas atmosphere. In the case that the elevating rate of the temperature is less than 2° C./min, there may be a problem with yield. In the case that the elevating rate of the temperature exceeds 10° C./min, there may be a problem of non-economic. In addition, in the case that the firstly elevating temperature is less than 600° C., the reaction may not be performed, and in the case that the temperature exceeds 800° C., there may be a problem with a C—N structure. In the case that the secondly elevating temperature is less than 800° C., there may be a problem with the removal of a nitrogen molecule, and in the case that the temperature exceeds 1,200° C., there may be a problem of non-economic.

That is, the yield may be maximized at the step of preparing a carbon fiber from a polyacrylonitrile (PAN) fiber through the control of the elevating temperature. The second elevation of the temperature after the first elevation of the temperature at the step of (4) is to remove the nitrogen molecule of the C—N structure. The nitrogen molecule of the C—N structure may be volatilized into $N_2$, $NH_3$, etc. through the controlling process of the elevating temperature during the carbonizing process.

Then, the step of (5) for hydrothermally treating the carbonized carbon nanofiber in an aqueous alkaline solution to extend the titanium dioxide ($TiO_2$) from the inner part to the outer part of the carbon nanofiber will be explained.

First, the aqueous alkaline solution may be a strong alkaline aqueous solution, and the hydrothermal treatment may be conducted at 120 to 180° C. for 20 to 48 hours. In the case that the temperature is less than 120° C., or the time period for the hydrothermal treatment is less than 20 hours, titanate nanotubes may not be formed. In the case that the temperature exceeds 180° C., or the time period exceeds 48 hours, the titanate may form a crystalline phase in a rod shape not in a nanotube shape, and a tube with high specific surface area may not be formed.

Through the hydrothermal treatment of the present invention, the titanium dioxide ($TiO_2$) included in the carbon nanofiber may be extended from the inner part to the outer part of the carbon nanofiber to form a plurality of titanate nanotube layers covering partially or entirely with the carbon nanofiber as a center.

The plurality of the titanate nanotubes covering a portion or the whole of the carbon nanofiber have a tube shape, and the appearance of the tube is not limited, and the length of the tube may be 0.1 to 10 μm, the average diameter of the tube may be 10 to 20 nm, and the thickness of the hollow of the tube may be 5 to 10 nm.

According to one aspect, a step of washing using distilled water or a weak acid may be further included between the step of (5) and the step of (6), and through the process, excessive amount of sodium ions present may be removed.

Finally, the step of (6) for post oxidizing the hydrothermally treated carbon nanofiber will be explained.

Through the post oxidation, a carbon nanofiber composite with effective adsorption and photocatalytic decomposition may be provided by the phase transition of a portion of the plurality of titanate nanotubes into the titanium dioxide ($TiO_2$) with an anatase crystalline phase having good photocatalytic activity in the present invention. In this case, when the crystalline phase of the titanium dioxide ($TiO_2$) is an anatase phase, the photocatalytic activity may be maximized.

According to one aspect, the step of (6) may be performed by heating the hydrothermally treated carbon nanofiber at 300 to 500° C. for 1 to 3 hours in an air atmosphere. In the case that the temperature is less than 300° C., or the treating time period of the post oxidation is less than 1 hour, the anatase phase may not be formed, and in the case that the temperature exceeds 500° C. or the treating time period of the post oxidation is greater than or equal to 3 hours, the carbon nanofiber may be oxidized.

According to the method for preparing a carbon nanofiber composite of the present invention, a carbon nanofiber composite with good removing performance of a harmful polluting material may be prepared when compared to a common preparation method, and preparation cost reduction with markedly improved yield may be attained. Thus, the carbon nanofiber composite prepared by the method for preparing according to the present invention may be used in an electrode for an electric double-layer super capacitor, a fuel cell electrode, a filter, a hydrogen storage material, etc.

According to another aspect of the present invention, a carbon nanofiber composite of the present invention including a carbon nanofiber; and a plurality of titanate nanotubes extended from the inner part to the outer part of the carbon nanofiber to cover a portion or a whole of the carbon nanofiber, is provided.

The carbon nanofiber in the present invention may have a pillar shape, and the appearance thereof is not limited thereto. The average diameter of the carbon nanofiber may be 500 to 800 nm.

In the present invention, the carbon nanofiber is hydrothermally treated to be extended from the inner part of the carbon nanofiber to the outer part thereof to be present as a plurality of titanate nanotubes covering a portion or the whole of the carbon nanofiber. The plurality of the titanate nanotubes may have a tube shape, and the appearance of the tube is not limited. The length of the tube may be from 0.1 to 10 μm, and the average diameter of the tube may be from 10 to 20 nm, and the thickness of the hollow of the tube may be from 5 to 10 nm.

In the case that the titanate nanotube produced from the inner part to the outer part of the carbon nanofiber has a firmly packed nanowire shape, the specific surface area may not be largely increased, and the phase transition reaction from the titanate to anatase titanium dioxide may not be easily conducted to decrease the decomposition rate of a harmful pollutant material.

Accordingly, a carbon nanofiber composite having better adsorption and photocatalytic decomposition effects than a common carbon nanofiber may be provided in the present invention by post oxidizing a carbon nanofiber composite including a carbon nanofiber; and a plurality of titanate nanotubes covering a part or the whole of the carbon nanofiber through the extension of the carbon nanofiber from the inner part to the outer part thereof to conduct the phase transition of a portion of the plurality of the titanate nanotubes into titanium dioxide ($TiO_2$) having an anatase crystalline phase and good photocatalytic activity.

A portion or the whole of the surface of the plurality of titanate nanotubes may include the titanium dioxide ($TiO_2$) having the anatase crystalline phase. This configuration may be attained by oxidizing a portion or the whole of the surface of the titanate nanotube. Further, the plurality of the titanate nanotubes covering a portion or the whole of the carbon nanofiber has a hollow pillar shape, and the appearance of a pillar is not limited. The length of the tube may be from 0.1 to 10 μm, the average diameter of the tube may be from 10 to 20 nm, and the thickness of the hollow of the tube may be from 5 to 10 nm.

According to another aspect of the present invention, an electrode for an electric double-layer supercapacitor including a case; an aqueous electrolyte solution introduced in the case; an anode formed on a current collector combined with a carbon nanofiber composite; a cathode immersed in the aqueous electrolyte solution; and a separator provided between the anode and the cathode to separate the anode and the cathode, a fuel cell electrode, a filter and a hydrogen storage material including a carbon nanofiber composite are provided.

MODE FOR CARRYING OUT THE INVENTION

Hereinafter, the present invention will be explained more particularly referring to embodiments. The embodiments are not intended to limit the scope of the present invention, however should be interpreted to assist the understanding of the present invention.

EXAMPLES

Example 1

10 wt % of a material of a carbon fiber precursor of PAN was dissolved in a DMF solvent to prepare a PAN solution. To the PAN solution, a titanium dioxide ($TiO_2$) powder with a nanosize prepared by a sol-gel method was added to prepare a PAN dispersion containing the titanium dioxide. The amount of the titanium dioxide ($TiO_2$) powder was 10 wt %. The dispersion was mechanically stirred for 4 hours to disperse the titanium dioxide ($TiO_2$) in the dispersion well and to mix completely.

The PAN dispersion including the titanium dioxide ($TiO_2$) was electrospinned in an electric field of 20 kV to prepare a carbon nanofiber containing the titanium dioxide ($TiO_2$).

After heating the carbon nanofiber in an oxygen atmosphere at 250° C. for 30 minutes, the temperature was firstly elevated to 750° C. with a temperature elevation rate of 5° C./min under a nitrogen gas, heating was performed while maintaining the temperature of 750° C. for 1 hour, the temperature was secondly elevated gradually to 1,400° C. with a temperature elevation rate of 5° C., and heating was performed while maintaining the temperature of 1,400° C. for 1 hour. Then, the reaction mixture was added to 50 mL of a 10 N aqueous NaOH solution, was hydrothermally treated at 150° C. for 24 hours, and washed with distilled water and a 0.1N HCl solution. The hydrothermally treated carbon nanofiber was heated for 1 hour in an air atmosphere while maintaining the temperature at 400° C. and oxidized to prepare a carbon nanofiber composite.

Comparative Example 1

A carbon nanofiber composite was prepared by performing the same procedure described in Example 1 except for excluding the hydrothermal treatment and the post oxidation treatment.

Comparative Example 2

A carbon nanofiber composite was prepared by performing the same procedure described in Example 1 except for excluding the hydrothermal treatment.

Comparative Example 3

A carbon nanofiber composite was prepared by performing the same procedure described in Example 1 except for excluding the post oxidation treatment.

Experimental Example 1

The carbon nanofiber composites prepared in Example 1 and Comparative Examples 1 to 3 were identified by taking an image with a scanning electron microscope (Hitachi S-4200 FE-SEM), and the results will be explained referring to FIG. 1 and FIGS. 2A to 2D.

Figure 1:
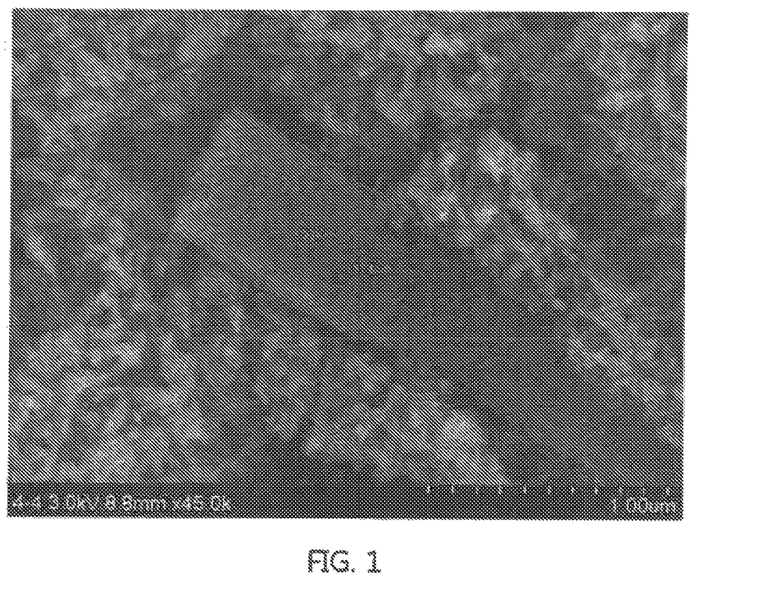
FIG. 1 is a scanning electronic microscopic image of a carbon nanofiber composite according to an embodiment of the present invention.

FIG. 1 is a scanning electronic microscopic image of a carbon nanofiber composite prepared in Example 1, and a shape of wrapping the surface of a carbon nanofiber having an average diameter of 600 nm with a plurality of titanate nanotubes with an outer average diameter of 20 nm and an inner average diameter of 10 nm may be observed.

Figure 2A:
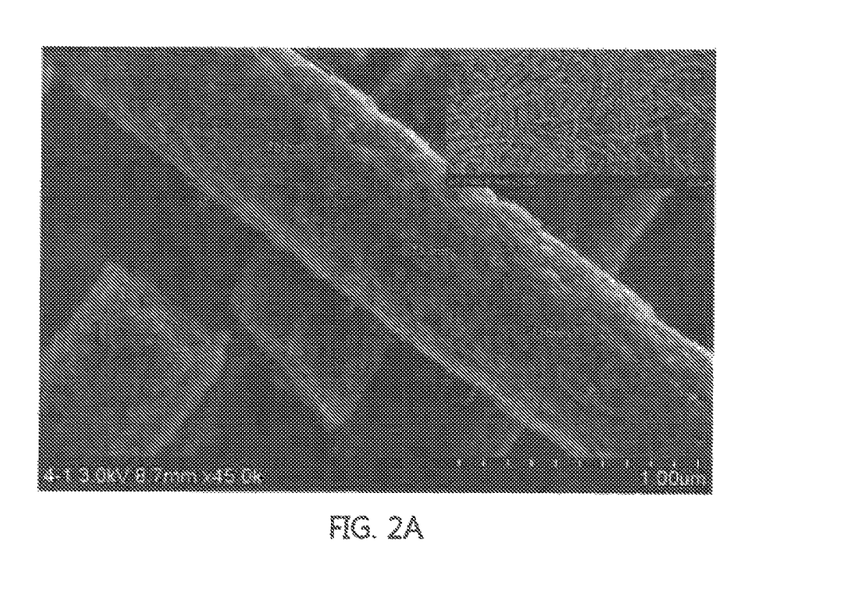
FIGS. 2A to 2D are scanning electronic microscopic images according to Comparative Examples 1 to 3 and Example 1.
Figure 2B:
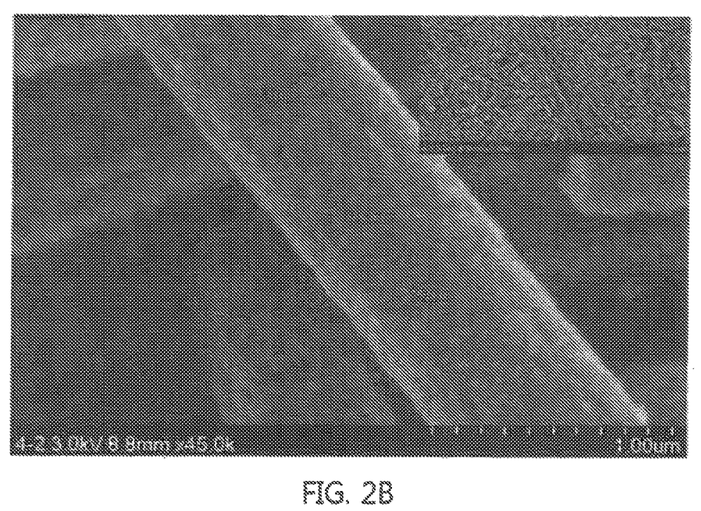
Figure 2C:
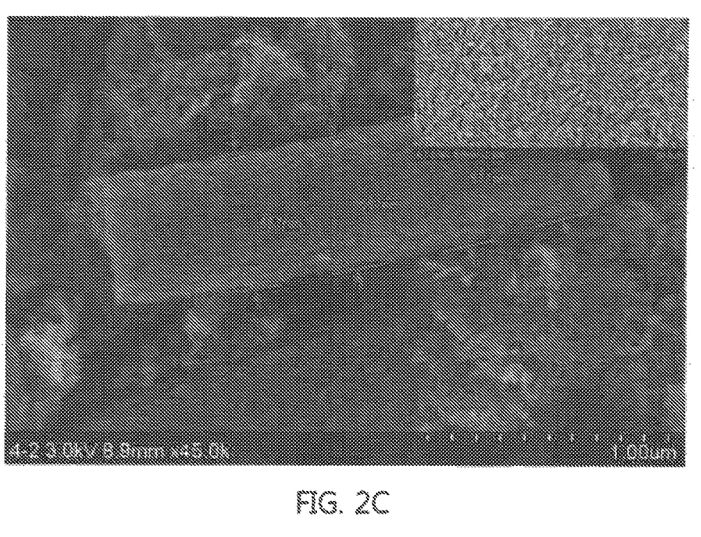
Figure 2D:
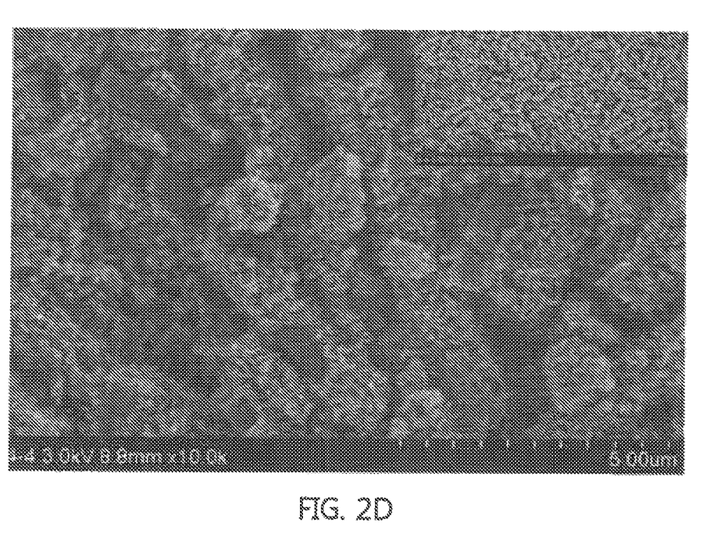

FIG. 2A corresponds to a scanning electronic microscopic image according to Comparative Examples 1, FIG. 2B corresponds to Comparative Example 2, FIG. 2C corresponds to Comparative Example 3 and FIG. 2D corresponds to Example 1. From Example 1 and Comparative Example 3, the production of the plurality of titanate nanotubes according to the hydrothermal treatment could be clearly secured, and almost no change of the shape according to the post oxidation treatment could be observed. Meanwhile, from Comparative Example 1, in the carbon nanofiber containing titanium dioxide, titanium dioxide particles could not be easily observed with naked eyes because the titanium dioxide particles with a several nanometer size synthesized by a sol-gel method were dispersed well in the PAN solution, and were present in a well dispersed state in a fiber phase even in a nanofiber and a carbon nanofiber present in the PAN solution Experimental Example 2

X-ray diffraction of the carbon nanofiber composite prepared in Example 1 and Comparative Examples 1 to 3 was taken (Rigaku D/MAX-2500, 18 kV) and secured. The results will be explained referring to FIGS. 3A and 3B.

Figure 3A:
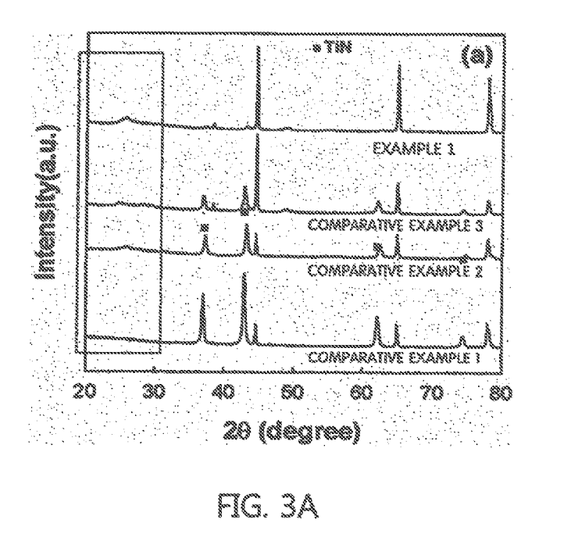
FIGS. 3A and 3B are X-ray diffraction pattern graphs according to Comparative Examples 1 to 3 and Example 1.
Figure 3B:
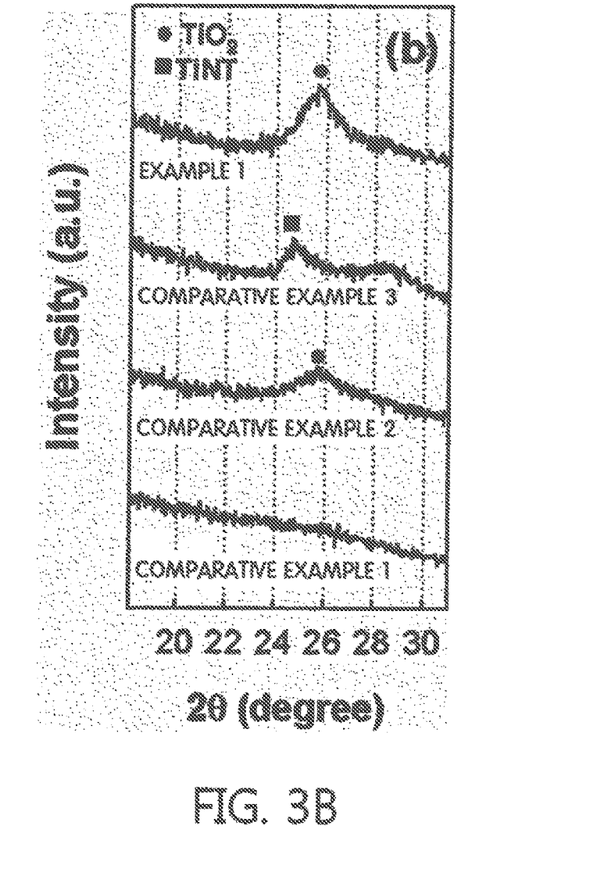

As shown in FIGS. 3A and 3B, the carbon nanofiber according to Comparative Example 1 was found that titanium dioxide was reduced to have a crystalline structure of titanium nitride (TiN). Through Comparative Example 2, it could be found that the phase of a portion of the titanium dioxide was changed to titanium dioxide with an anatase crystalline phase. The crystalline phase of the titanium nitride was completely changed in Example 1, and was hardly shown in the structure of a carbon nanofiber composite. In addition, when comparing Comparative Example 3 with Example 1, it may be secured that only the crystalline phase of titanate could be observed, and the phase of a portion of the titanium dioxide with the anatase crystalline phase was changed according to the post oxidation.

Experimental Example 3

The photocatalytic decomposition of an acetaldehyde gas through the irradiation of ultraviolet light to the carbon nanofiber composites prepared in Example 1 and Comparative Examples 1 to 3 was measured by means of gas chromatography (GC) using HP6890, Porapak-Q column, thermal conductivity detector (TCD), and the measured results will be explained referring to FIGS. 4A and 4B.

Figure 4A:
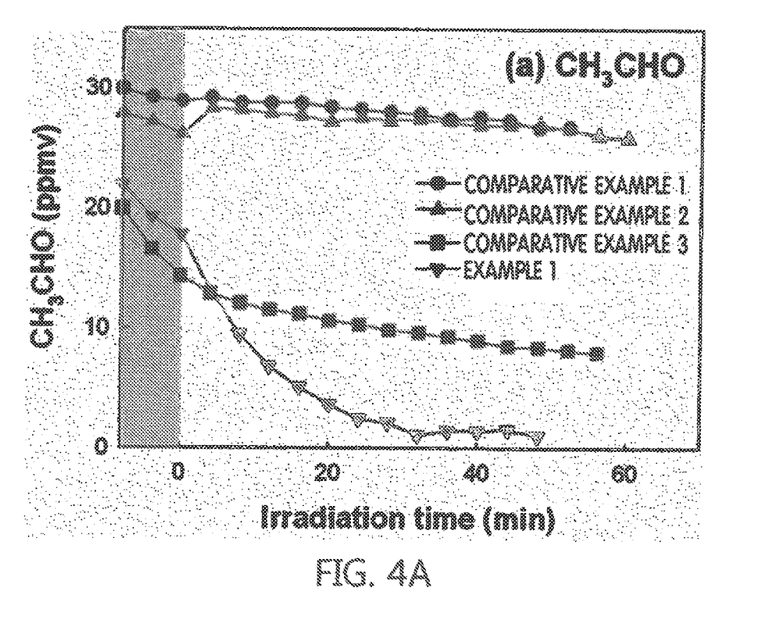
FIGS. 4A and 4B are schematized graphs on the results of Experimental Example 1.
Figure 4B:
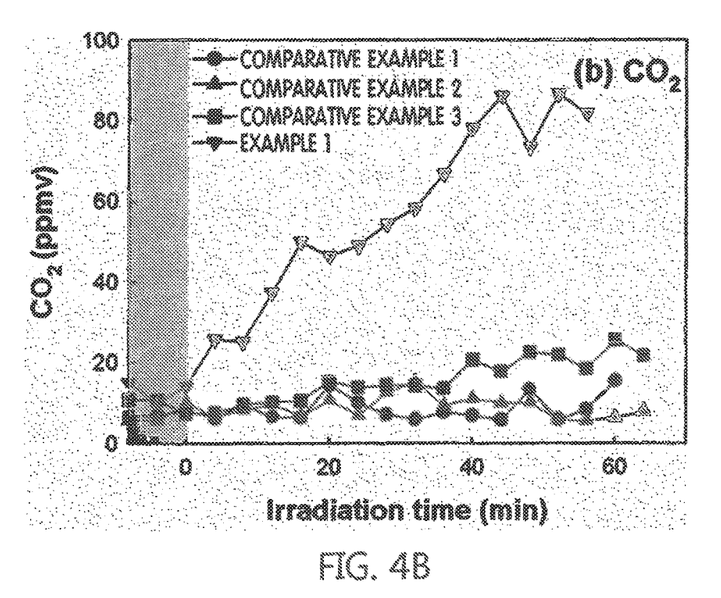

Referring to FIG. 4A, the concentration of the acetaldehyde was decreased as soon as the acetaldehyde makes contact with the carbon nanofiber composite before the irradiation to the ultraviolet light for the case of Comparative Example 3 and Example 1, because the acetaldehyde gas was adsorbed onto the carbon nanofiber composite. In Comparative Example 3 and Example 1, a plurality of titanate nanotubes were produced on the surface of the carbon nanofiber through the hydrothermal treatment, and the adsorption reaction of the acetaldehyde was considered to be actively conducted due to the nanotubes. When exposed to the ultraviolet light, almost no effects were shown for the case of Comparative Example 3, however, the amount of the acetaldehyde was markedly decreased, and the concentration of carbon dioxide produced through the decomposition of the acetaldehyde was rapidly increased for the case of Example 1. A portion of the plurality of titanate nanotubes on the surface of the carbon nanofiber was thought to undergo phase transition into titanium dioxide with an anatase crystalline phase showing high photocatalytic activity. The adsorption and decomposition of the acetaldehyde were insignificant for the case of Comparative Example 2. Titanium dioxide was mostly present in the carbon nanofiber for the case of Comparative Example 2, and the photocatalytic activity could be hardly exhibited.

Although the description above contains much specificity, these should not be construed as limiting the scope of the invention but as merely providing illustrations of this invention. Various other embodiments and ramifications are possible within its scope.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The invention has been described with reference to several embodiments. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A method for preparing a carbon nanofiber composite, comprising:
    preparing a spinning solution by mixing a material of a carbon fiber precursor, titanium dioxide ($TiO_2$), and a solvent;
    preparing a carbon nanofiber by electrospinning the spinning solution;
    heating the carbon nanofiber to stabilize;
    heating the stabilized carbon nanofiber in an inert atmosphere to carbonize;
    hydrothermally treating the carbonized carbon nanofiber in an aqueous alkaline solution to extend the titanium dioxide ($TiO_2$) from the inner part to the outer part of the carbon nanofiber into a titanate nanotube shape; and
    post oxidizing the hydrothermally treated carbon nanofiber.

2. The method for preparing a carbon nanofiber composite of claim 1, wherein the carbon fiber precursor is at least one selected from the group consisting of polyacrylonitrile (PAN), polymethylmethacrylate (PMMA), polyethylene oxide (PEO), polyvinyldifluoride and polypyrrole, and is comprised in an amount ratio of 5 to 30 wt % with respect to 100 wt % of the spinning solution.

3. The method for preparing a carbon nanofiber composite of claim 1, wherein the titanium dioxide ($TiO_2$) is comprised in an amount ratio of 1 to 30 wt % with respect to 100 wt % of the spinning solution.

4. The method for preparing a carbon nanofiber composite of claim 1, wherein the titanium dioxide ($TiO_2$) is synthesized by a sol-gel method and has a nanosize.

5. The method for preparing a carbon nanofiber composite of claim 1, wherein the solvent is at least one selected from the group consisting of N,N-dimethylformamide (DMF), tetrahydrofuran (THF), γ-butyrolactone (GBL), N-methyl pyrrolidone, toluene, acetone and dimethyl acetamide (DMAc).

6. The method for preparing a carbon nanofiber composite of claim 1, wherein the electrospinning in is conducted in an electric field of 10 to 30 kV.

7. The method for preparing a carbon nanofiber composite of claim 1, wherein, in order to stabilize the carbon nanofiber, the carbon nanofiber is heated at 220 to 280° C. for 15 to 45 minutes in an air atmosphere.

8. The method for preparing a carbon nanofiber composite of claim 1, wherein heating the stabilized carbon nanofiber in an inert atmosphere to carbonize comprises elevating the temperature to 600 to 800° C. with an elevating rate of 2 to 10° C./min in an inert gas atmosphere, heating at the temperature of 600 to 800° C. for 40 to 60 minutes, secondly elevating the temperature to 1,000 to 1,400° C. with an elevating rate of 2 to 10° C./min, and heating at the temperature of 1,000 to 1,400° C. for 40 to 60 minutes.

9. The method for preparing a carbon nanofiber composite of claim 1, wherein the aqueous alkaline solution is a strongly alkaline solution.

10. The method for preparing a carbon nanofiber composite of claim 9, wherein the hydrothermal treatment is conducted at 120 to 180° C. for 20 to 24 hours.

11. The method for preparing a carbon nanofiber composite of claim 1, further comprising a step of washing using distilled water or a weak acid after hydrothermally treating the carbonized carbon nanofiber.

12. The method for preparing a carbon nanofiber composite of claim 1, wherein post oxidizing the hydrothermally treated carbon nanofiber comprises heating the hydrothermally treated carbon nanofiber at 300 to 500° C. for 1 to 3 hours in an air atmosphere.

13. A carbon nanofiber composite, comprising:
a carbon nanofiber; and
a plurality of titanate nanotubes extended from an inner part to an outer part of the carbon nanofiber to cover a portion or a whole of the carbon nanofiber.

14. The carbon nanofiber composite of claim 13, wherein a portion or a whole of a surface of the plurality of titanate nanotubes comprises titanium dioxide having an anatase crystalline phase.

15. An electrode for an electric double-layer supercapacitor, comprising:
a case;
an aqueous electrolyte solution introduced in the case;
an anode formed on a current collector combined with the carbon nanofiber composite of claim 13;
a cathode immersed in the aqueous electrolyte solution; and
a separator provided between the anode and the cathode for separating the anode and the cathode.

* * * * *